(12) United States Patent
Monro

(10) Patent No.: US 12,034,980 B2
(45) Date of Patent: *Jul. 9, 2024

(54) VIDEO CODING WITH EMBEDDED MOTION

(71) Applicant: Xylon LLC, Las Vegas, NV (US)

(72) Inventor: Donald Martin Monro, Beckington (GB)

(73) Assignee: Xylon LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,653

(22) Filed: Apr. 4, 2023

(65) Prior Publication Data

US 2023/0319323 A1    Oct. 5, 2023

Related U.S. Application Data

(63) Continuation of application No. 17/209,570, filed on Mar. 23, 2021, now Pat. No. 11,622,133, which is a continuation of application No. 16/729,748, filed on Dec. 30, 2019, now Pat. No. 10,958,944, which is a continuation of application No. 16/259,867, filed on Jan. 28, 2019, now Pat. No. 10,523,974, which is a continuation of application No. 11/678,479, filed on Feb. 23, 2007, now Pat. No. 10,194,175.

(51) Int. Cl.
| | |
|---|---|
| *H04N 19/97* | (2014.01) |
| *H04N 19/31* | (2014.01) |
| *H04N 19/537* | (2014.01) |
| *H04N 19/61* | (2014.01) |
| *H04N 19/63* | (2014.01) |

(52) U.S. Cl.
CPC ............ *H04N 19/97* (2014.11); *H04N 19/31* (2014.11); *H04N 19/537* (2014.11); *H04N 19/61* (2014.11); *H04N 19/63* (2014.11)

(58) Field of Classification Search
CPC ...... H04N 19/97; H04N 19/31; H04N 19/537; H04N 19/61; H04N 19/63
See application file for complete search history.

(56) References Cited

U.S. PATENT DOCUMENTS

| | | | |
|---|---|---|---|
| 4,675,809 | A | 6/1987 | Omoda |
| 4,908,873 | A | 3/1990 | Philbert et al. |
| 5,067,015 | A | 11/1991 | Combridge et al. |
| 5,218,435 | A | 6/1993 | Lim et al. |
| 5,315,670 | A | 5/1994 | Shapiro |

(Continued)

FOREIGN PATENT DOCUMENTS

| | | |
|---|---|---|
| CN | 1864177 A | 11/2006 |
| EP | 0 595 599 A2 | 5/1994 |

(Continued)

OTHER PUBLICATIONS

De Natale, et al., "A Mesh-Interpolation Scheme for Very-Low Bitrate Coding of Video Sequences" European Transactions on Telecommunications, vol. 9, No. 1, pp. 47-55, 1998.

(Continued)

*Primary Examiner* — Techane Gergiso
(74) *Attorney, Agent, or Firm* — Sterne, Kessler, Goldstein & Fox P.L.L.C.

(57) ABSTRACT

Implementations related to coding and/or decoding image data employing video coding with embedded motion are disclosed.

18 Claims, 8 Drawing Sheets

(56) References Cited

U.S. PATENT DOCUMENTS

| | | | |
|---|---|---|---|
| 5,321,776 | A | 6/1994 | Shapiro |
| 5,412,741 | A | 5/1995 | Shapiro |
| 5,559,931 | A | 9/1996 | Shindou et al. |
| 5,699,121 | A | 12/1997 | Zakhor et al. |
| 5,819,017 | A | 10/1998 | Akeley et al. |
| 5,873,076 | A | 2/1999 | Barr et al. |
| 5,956,429 | A | 9/1999 | Burns |
| 6,029,167 | A | 2/2000 | Evans |
| 6,052,416 | A | 4/2000 | Koga |
| 6,086,706 | A | 7/2000 | Brassil et al. |
| 6,125,348 | A | 9/2000 | Levine |
| 6,144,835 | A | 11/2000 | Inoue |
| 6,208,744 | B1 | 3/2001 | Ishige et al. |
| 6,212,235 | B1 | 4/2001 | Nieweglowski et al. |
| 6,336,050 | B1 | 1/2002 | Amin et al. |
| 6,434,542 | B1 | 8/2002 | Farmen et al. |
| 6,480,547 | B1 | 11/2002 | Chen et al. |
| 6,625,213 | B2 | 9/2003 | Bottreau et al. |
| 6,654,503 | B1 | 11/2003 | Sudharsanan et al. |
| 6,820,079 | B1 | 11/2004 | Evans |
| 6,874,966 | B2 | 1/2005 | Sommer et al. |
| 6,990,145 | B2 | 1/2006 | Monro et al. |
| 7,003,039 | B2 | 2/2006 | Zakhor et al. |
| 7,079,986 | B2 | 7/2006 | Sieracki |
| 7,230,551 | B2 | 6/2007 | Moriya et al. |
| 7,511,638 | B2 | 3/2009 | Monro |
| 7,511,639 | B2 | 3/2009 | Monro |
| 7,545,291 | B2 | 6/2009 | Monro |
| 7,548,176 | B2 | 6/2009 | Monro |
| 7,586,424 | B2 | 9/2009 | Monro |
| 7,602,316 | B2 | 10/2009 | Monro |
| 7,671,767 | B2 | 3/2010 | Monro |
| 7,737,869 | B2 | 6/2010 | Monro |
| 8,055,085 | B2 | 11/2011 | Monro |
| 8,130,828 | B2 | 3/2012 | Hsu et al. |
| 8,144,037 | B2 | 3/2012 | Monro |
| 8,503,536 | B2 | 8/2013 | Zuo et al. |
| 10,194,175 | B2 | 1/2019 | Monro |
| 10,523,974 | B2 | 12/2019 | Monro |
| 10,958,944 | B2 | 3/2021 | Monro |
| 11,622,133 | B2 | 4/2023 | Monro |
| 2001/0028683 | A1 | 10/2001 | Bottreau et al. |
| 2002/0069206 | A1 | 6/2002 | Bergman et al. |
| 2002/0118755 | A1* | 8/2002 | Karczewicz ............ H04N 19/89 375/240.18 |
| 2003/0108101 | A1* | 6/2003 | Frossard ................ H04N 19/97 375/240.03 |
| 2003/0179825 | A1 | 9/2003 | Sekiguchi et al. |
| 2004/0028135 | A1 | 2/2004 | Monro |
| 2004/0126018 | A1 | 7/2004 | Monro |
| 2004/0151245 | A1 | 8/2004 | Lainema et al. |
| 2004/0165737 | A1 | 8/2004 | Monro |
| 2004/0184666 | A1 | 9/2004 | Sekiguchi et al. |
| 2004/0218836 | A1 | 11/2004 | Kanatsu |
| 2005/0149296 | A1 | 7/2005 | Sieracki |
| 2006/0029253 | A1 | 2/2006 | Pace |
| 2006/0203906 | A1 | 9/2006 | Divorra Escoda et al. |
| 2007/0016414 | A1 | 1/2007 | Mehrotra et al. |
| 2007/0019723 | A1 | 1/2007 | Valente |
| 2007/0030177 | A1 | 2/2007 | Monro |
| 2007/0053434 | A1 | 3/2007 | Monro |
| 2007/0053597 | A1 | 3/2007 | Monro |
| 2007/0053603 | A1 | 3/2007 | Monro |
| 2007/0140342 | A1 | 6/2007 | Karczewicz et al. |
| 2007/0164882 | A1 | 7/2007 | Monro |
| 2007/0237221 | A1 | 10/2007 | Hsu et al. |
| 2007/0248163 | A1 | 10/2007 | Zuo et al. |
| 2007/0252733 | A1 | 11/2007 | Thebault et al. |
| 2007/0258654 | A1 | 11/2007 | Monro |
| 2007/0271250 | A1 | 11/2007 | Monro |
| 2007/0282933 | A1 | 12/2007 | Monro |
| 2007/0290898 | A1 | 12/2007 | Monro |
| 2007/0290899 | A1 | 12/2007 | Monro |
| 2008/0005648 | A1 | 1/2008 | Monro |
| 2008/0055120 | A1 | 3/2008 | Monro |
| 2008/0056346 | A1 | 3/2008 | Monro |
| 2008/0084924 | A1 | 4/2008 | Monro |
| 2008/0086519 | A1 | 4/2008 | Monro |
| 2008/0201352 | A1 | 8/2008 | Monro |
| 2008/0205523 | A1 | 8/2008 | Monro |
| 2009/0103602 | A1* | 4/2009 | Xiong ................ H04N 19/97 375/240.01 |
| 2010/0040146 | A1* | 2/2010 | Wang ................ H04N 19/194 375/E7.115 |

FOREIGN PATENT DOCUMENTS

| | | | | |
|---|---|---|---|---|
| EP | 0 836 325 | A1 | 4/1998 | |
| EP | 083 6325 | A1 | 4/1998 | |
| EP | 1 545 010 | A1 | 6/2005 | |
| EP | 1 610 560 | A | 12/2005 | |
| GB | 2 293 733 | A | 4/1996 | |
| GB | 2 409 943 | A | 7/2005 | |
| WO | WO 97/16029 | | 5/1997 | |
| WO | WO 99/08449 | | 2/1999 | |
| WO | WO2001/15456 | | 3/2001 | |
| WO | WO 01/63935 | A1 | 8/2001 | |
| WO | WO2002/13538 | | 2/2002 | |
| WO | WO2004/051863 | | 6/2004 | |
| WO | WO-2004086302 | A1 * | 10/2004 | ........... A61F 2/0059 |
| WO | WO2005/027049 | | 3/2005 | |
| WO | WO 2005/064799 | | 7/2005 | |
| WO | WO 2005/067661 | | 7/2005 | |
| WO | WO2005/119581 | | 12/2005 | |
| WO | WO2007/030702 | | 3/2007 | |
| WO | WO2007/030784 | | 3/2007 | |
| WO | WO2007/030785 | | 3/2007 | |
| WO | WO2007/030788 | | 3/2007 | |
| WO | WO 2007/084336 | | 7/2007 | |
| WO | WO 2007/118220 | | 10/2007 | |
| WO | WO 2007/145875 | | 12/2007 | |
| WO | WO 2007/149358 | | 12/2007 | |
| WO | WO 2007/149383 | | 12/2007 | |
| WO | WO 2007/149384 | | 12/2007 | |
| WO | WO 2008/027450 | | 3/2008 | |
| WO | WO 2008/030426 | | 3/2008 | |
| WO | WO-2008036112 | A1 * | 3/2008 | ........... H04N 19/194 |
| WO | WO/2008/045280 | | 4/2008 | |
| WO | WO/2008/045281 | | 4/2008 | |

OTHER PUBLICATIONS

Tian et al., "Image Data Processing in the Compressed Wavelet Domain" Proceedings of ICSP'96, pp. 978-981, 1996.

Said et al., "A New, Fast, and Efficient Image Codec Based on Set Partitioning in Hierarchical Trees" IEEE Transactions on Circuits and Systems for Video Technology, vol. 6, No. 3, pp. 243-250, Jun. 1996.

Monro et al., "Alignment Blur in Coherently Averaged Images" IEEE Transactions on Signal Processing, vol. 44, No. 6, pp. 1596-1601, Jun. 1996.

Shapiro, "Embedded Image Coding Using Zerotrees of Wavelet Coefficients" IEEE Transactions on Signal Processing, vol. 41, No. 12, pp. 3445-3462, Dec. 1993.

Horst et al., "Mupcos: A multi-purpose coding scheme" Signal Processing: Image Communication 5,pp. 75-89,1993.

Brin et al., Copy detection mechanisms for digital documents, Proceedings of the 1995 ACM SIGMOD international conference on Management of data SIGMOD '95, vol. 24 ACM Press, May 1995, pp. 398-409.

Cancedda et al., Word Sequence Kernels, Mar. 2003, MIT Press, Journal of Machine Learning Research, vol. 3 Special Edition, pp. 1059-1082.

Cover et al. "Elements of Information Theory" Copyright Jon Wiley & Sons, Inc., p. 96, 1991.

Czerepinski et al., "Matching Pursuits Video Coding: Dictionaries and Fast Implementation" IEEE Trans Circuit Systems Video Technology, vol. 10, No. 7, pp. 1103-1115, Oct. 2000.

Daubechies, "Orthonormal Bases of Compactly Supported Wavelets" Comm. Pure Appl. Math., vol. 41 pp. 909-996, 1998.

(56) References Cited

OTHER PUBLICATIONS

De Vleeschouwer et al., "Subband dictionaries for low-cost matching pursuits of video residues," IEEE Transactions on Circuits and Systems for Video Technology, vol. 9, Issue 7, pp. 984-993, Oct. 1999.
Figueras et al., "Color Image Scalable Coding with Matching Pursuit" IEEE Int. Conference Acoustics Speech Signal Process, pp. III-53-56, May 2004.
Frossard et al., "High Flexibility Scalable Image Coding" Proceedings of VCIP 2003, Jul. 2003.
Gamito et al. "Lossles Coding of Floating Point Data with JPEG 2000 Part 10" Proceedings of the SPIE, SPIE, Bellingham, VA, US. vol. 5558, Aug. 2, 2004. pp. 276-287.
Golomb, S.W., "Run-length encodings" IEEE Trans Info Theory, Jul. 1966, 12(3):399-401.
Hosang, M., "A Character Elimination Algorithm for Lossless Data Compression" Data Compression Conference, Proceedings. DCC, IEEE Computer Society Press, Los Alamitos, CA, US, Apr. 2, 2002, pp. 1-10.
Huffman, David A., "A Method for the Construction of Minimum-Redundancy Codes," Pro. Inst. Radio Eng., 1952, 9 (40), pp. 1098-1101.
Hull, Jonathan J., "Document Image Matching and Retrieval with Multiple Distortion-Invariant Descriptors", International Association for Pattern Recognition Workshop on Document Analysis Systems, Series in Machine Perception and Artificial Intelligence, vol. 14, published by World Scientific Publishing Co. Pte. Ltd. 1995, pp. 379-396.
Jun-peng Bao et al., "A new text feature extraction model and its application in document copy detection" Machine Learning and Cybernetics, 2003, International Conference on Nov. 2-5, 2003 Piscataway, NJ, USA, IEEE, vol. 1, Nov. 2, 2003, pp. 82-87.
Larsson, N.J., "The Context Trees of Block Sorting Compression" In Proceedings of the IEEE Data Compression Conference, Snowbird, Utah, Mar. 30-Apr. 1, pp. 189-198. IEEE Computer Society Press, 1998.
Mallat et al., "Matching Pursuits with Time-Frequency Dictionaries" IEEE Trans. Signal Processing, vol. 41. No. 12, pp. 3397-3415, Dec. 1993.
Mallat, "A Theory for Multiresolution Signal Decomposition: The Wavelet Representation" IEEE Trans. Pattern Anal. Mach. Intel., vol. 11, No. 7, Jul. 1989.
Monro et al., "Bases for Low Complexity Matching Pursuits Image Coding" Dept. of Electron. & Electr. Eng., Bath Univ., UK, 2005. IEEE International Conference on Image Processing, Publication Date: Sep. 11-14, 2005. vol. 2, pp. 249-252.
Monro et al., "Improved Coding of Atoms in Matching Pursuits" IEEE Int. Conference. Image Processing, vol. 2, Sep. 2003.
Monro et al., "Visual Embedding of Wavelet Transformation Coefficients" IEEE International Conference Image Process, pp. 186-189, Sep. 2000.
Monro, "Basis Picking for Matching Pursuits Image Coding" IEEE International Conference on Image Processing, pp. 2495-2498, Sep. 2004.
Moschetti et al., "New Dictionary and Fast Atom Searching Method for Matching Pursuit Representation of Displaced Frame Difference" IEEE International Conference on Image Processing, pp. II-685-688, Sep. 2002.
Neff et al., "Matching Pursuit Video Coding—Part I: Dictionary Approximation" IEEE Trans. Circuits System Video Technology, vol. 12, No. 1, pp. 13-26, Jan. 2002.
Neff et al., "Very Low Bit-Rate Video Coding Based on Matching Pursuits" IEEE Trans. Circuits and Systems for Video Tech., vol. 7, No. 1, pp. 158-171, Feb. 1997.
Poh et al., "Comparison of Residual Compression Methods in Motion Compensated Video" IEEE Int. Workshop on Multimedia Signal Processing, pp. 109-112, Dec. 2002.
R. F. Rice, "Some Practical Universal Noiseless Coding Techniques," Jet Propulsion Laboratory, Pasadena, California, JPL Publication 79-22, Mar. 1979.
Ramchandran et al., "Best Wavelet Packet Bases in a Rate-Distortion Sense" IEEE Transactions on Signal Processing, vol. 2, No. 2, pp. 160-175, Apr. 1993.
Sayood, Khalid, "Introduction to Data Compression" Morgan Kaufmann Publishers Inc., San Francisco, CA, USA 1996, pp. 27-32.
Sayood, Khalid, "Introduction to Data Compression" Morgan Kaufmann Publishers Inc., San Francisco, CA, USA 1991, pp. 98-99.
Salomon, "Data Compression: the complete reference", Springer, pp. 32-33, 1998.
Schleimer et al., Data security protection: Winnowing: local algorithms for document fingerprinting, 2003 ACM SIGMOD international conference on Management of data (SIGMOD '03), ACM Press, Jun. 2003, pp. 76-85.
Steffen et al., "Theory of Regular M-band Wavelets Bases" IEEE Transactions on Signal Processing, vol. 41. No 12, pp. 3497-3511, Dec. 1993.
Teuhola, J. "A Compression Method for Clustered Bit-Vectors" Information Processing Letters, Amsterdam, NL, vol. 7, No. 6, pp. 308-311, Oct. 1978.
Tredwell et al., "A Sequential Vector Selection Algorithm for Controllable Bandwidth Motion Description Encoding" IEEE Sympos. Intell. Multimedia. Video & Speech Process, May 2001.
Trott et al. "Wavelets Applied to Lossless Compression and Progressive Transmission of Floating Point Data in 3-D Curvilinear Grids" IEEE Proceedings of the Visualization Conference, Oct. 27, 1996, pp. 385-388.
Yuan et al., "Improved Matching Pursuits Image Coding" IEEE International Conference on Acoustics, Speech and Signal Processing ICASSP 2005, pp. II-201-204, Mar. 2005.
Yuan et al., "Low Complexity Separable Matching Pursuits" IEEE Int. Conference Acoustics Speech Signal Process, pp. III-725-728, May 2004.
Donald Monro, U.S. Appl. No. 11/677,515, filed Feb. 21, 2007, entitled "Hierarchical Update Scheme for Extremum Location with Indirect Addressing".
Donald Monro, U.S. Appl. No. 11/678,004, filed Feb. 22, 2007, entitled, "Video Coding With Motion Vectors Determined By Decoder".
Donald Monro, U.S. Appl. No. 11/678,479, filed Feb. 23, 2007, entitled, "Video Coding With Embedded Motion".
Donald Monro, U.S. Appl. No. 11/777,256, filed Jul. 11, 2007.
Donald Monro, U.S. Appl. No. 11/677,511, filed Feb. 21, 2007, entitled "Hierarchical Update Scheme For Extremum Location".
Donald Monro, U.S. Appl. No. 11/777,239, filed Jul. 12, 2007.
Donald Monro, U.S. Appl. No. 11/777,230, filed Jul. 12, 2007.
Donald Monro, U.S. Appl. No. 11/777,130, filed Jul. 12, 2007.
Donald Monro, U.S. Appl. No. 11/777,144, filed Jul. 12, 2007.
Donald Monro, U.S. Appl. No. 11/777,122, filed Jul. 12, 2007.
Donald Monro, U.S. Appl. No. 11/777,100, filed Jul. 12, 2007.
Donald Monro, U.S. Appl. No. 11/777,081, filed Jul. 12, 2007.
Donald Monro, U.S. Appl. No. 11/777,022, filed Jul. 12, 2007.
Donald Monro, U.S. Appl. No. 11/776,786, filed Jul. 12, 2007.
Donald Monro, PCT Serial No. PCT/US2007/008861, filed Apr. 9, 2007, entitled "Motion Assisted Data Enhancement".
Donald Monro, PCT Serial No. PCT/US2008/002100, filed Feb. 19, 2008, entitled "Hierarchical Update Scheme For Extremum Location".
Donald Monro, PCT Serial No. PCT/US2008/002101, filed Feb. 19, 2008, entitled "Hierarchical Update Scheme for Extremum Location with Indirect Addressing".
International Search Report for Appln. No. PCT/US2007/013100 issued Jan. 14, 2008, 4pgs.
International Search Report for Appln. No. PCT/US2007/000759 issued Feb. 14, 2008, 7pgs.
International Search Report for Appln. No. PCT/US2007/014138 issued Oct. 29, 2007, 2 pgs.
International Search Report for Appln. No. PCT/US2007/014182 issued Jan. 18, 2008, 1 pg.
International Search Report for Appln. No. PCT/US2007/014181 issued Jan. 14, 2008.
Non-Final Office Action for U.S. Appl. No. 11/255,090, completed Feb. 2, 2008, mailed Feb. 6, 2008, 14pgs.
Non-Final Office Action for U.S. Appl. No. 11/332,777, completed Dec. 12, 2007, mailed Dec. 21, 2007, 4pgs.

(56) References Cited

OTHER PUBLICATIONS

Final Office Action for U.S. Appl. No. 11/425,142, completed Sep. 10, 2007, mailed Sep. 18, 2007, 9 pgs.
Non-Final Office Action for U.S. Appl. No. 11/425,142, completed Mar. 7, 2007, mailed Mar. 20, 2007, 8 pgs.
Non-Final Office Action for U.S. Appl. No. 11/470,611, completed Aug. 29, 2007, mailed Sep. 5, 2007, 6 pgs.
Written Opinion for Appln. No. PCT/US2007/000759 completed Feb. 14, 2007, mailed Feb. 25, 2008, 11pgs.
International Search Report for Patent Cooperation Treaty Appln. No. PCT/US2007/019034 issued Apr. 8, 2008, 2 pgs.
Written Opinion for Patent Cooperation Treaty Appln. No. PCT/US2007/019034 completed Mar. 31, 2008, mailed Apr. 8, 2008, 7 pgs.
Non-Final Rejection for U.S. Appl. No. 11/470,611, mailed on Jun. 30, 2008, 5 pgs.
Non-Final Rejection for U.S. Appl. No. 11/422,316, mailed on Jul. 3, 2008, 7 pgs.
Choog Soo Park et al., "Lost Motion Vector Recovery Algorithm," Circuits and Systems, IEEE International Symposium on London, vol. 3, 1994, pp. 229-232.
Final Office Action for U.S. Appl. No. 11/332,777, mailed Aug. 13, 2008, 5 pgs.
Final Office Action for U.S. Appl. No. 11/255,090, mailed Sep. 3, 2008, 11 pgs.
Non-Final Office Action for U.S. Appl. No. 11/425,142, mailed Sep. 16, 2008, 12 pgs.
International Search Report for Appln. No. PCT/US2008/002179, issued Aug. 20, 2008, 12 pgs.
Non-Final Office Action for U.S. Appl. No. 11/255,090, dated Dec. 15, 2008, 11 pgs.
International Search Report and Written Opinion for Appln. No. PCT/US2008/002101, dated Dec. 12, 2008, 13 pgs.
Cotter et al., "Application of Tree-Based Searches to Matching Pursuit," 2001 IEEE International Conference on Acoustics, Speech and Signal Processing, New York, NY, vol. 6, 7, May 2001, pp. 3933-3936.
Shoa et al., "Tree Structure Search for Matching Pursuit," Image Processing, 2005, vol. 3, 11, pp. 908-911.
Qiangsheng Liu et al., "A low-cost video encoder with matching pursuit," Intelligent Multimedia, Video and Speech Processing, May 2, 2001, pp. 502-505.
Yuan Yuan et al., "Improved Matching Pursuits Image Coding," Acoustics, Speech, and Signal Processing, 2005, vol. 2, 18, pp. 201-204.
International Search Report and Written Opinion for Appln. No. PCT/US2008/002100, dated Dec. 12, 2008, 14 pgs.
International Search Reportfor Appln. No. PCT/US2007/021302, dated Dec. 10, 2008, 5 pgs.
Haoxing Zhang et al., "A Hybrid Video Coder Based on H.264 with Matching Pursuits," Acoustics, Speech and Signal Processing, 2006, p. 889.

Yuan et al., "3D Wavelet Video Coding with Replicated Matching Pursuits," Sep. 11, 2005, Image Processing, pp. 69-72.
Monro et al., "Subband Adaptive Dictionaries for Wavelet/Matching Pursuits Image Coding," Oct. 8, 2006, Image Processing, p. 2136.
Chien-Kai et al., "Matching Pursuits Low Bit Rate Video Coding with Codebooks Adaptation," Jun. 5, 2000, Acoustics, Speech, and Signal Processing, pp. 408-411.
International Search Report for Appln. No. PCT/US2007/021303, dated Dec. 12, 2008, 5 pgs.
Rabiee et al., "Scalable Subband Image Coding with Segmented Orthogonal Matching Pursuit," Oct. 4, 1998, Image Processing, pp. 774-777.
Rabiee et al., "Low-bit-rate Subband Image Coding with Matching Pursuits," Visual Communications and Image Processing, vol. 3309, 1998, pp. 875-880.
Schmid-Saugeon et al., "Dictionary Design for Matching Pursuit and Application to Motion-Compensated Video Coding," 2004, IEEE Transactions on Circuits and Systems for Video Technology, pp. 880-886.
International Search Report for Appln. No. PCT/US2007/019297, dated Dec. 12, 2008, 5 pgs.
Non-Final Office Action for U.S. Appl. No. 11/422,316, mailed Dec. 4, 2008, 13 pgs.
Non-Final Office Action for U.S. Appl. No. 11/255,090, mailed Dec. 15, 2008, 15 pgs.
Non-Final Office Action for U.S. Appl. No. 11/332,777, mailed Feb. 25, 2009, 6 pgs.
Final Office Action for U.S. Appl. No. 11/425,142, mailed Mar. 2, 2009, 18 pgs.
International Search Report for Appln. No. PCT/US2007/014181 issued Jan. 23, 2008, 1 pg.
David Salomon, "Data Compression: The Complete Reference," 1998, Springer, XP002464409, pp. 32-33.
Non-Final Office Action for U.S. Appl. No. 11/677,511, mailed Feb. 20, 2009, 23 pgs.
Non-Final Office Action for U.S. Appl. No. 11/677,515, mailed Feb. 25, 2009, 21 pgs.
International Search Report and Written Opinion of the International Searching Authority directed to related International Patent Application No. PCT/US2008/002255, mailed Nov. 13, 2008; 10 pages.
International Preliminary Report on Patentability directed to related International Patent Application No. PCT/US2008/002255, issued Aug. 26, 2009; 7 pages.
Escoda et al., "A Bayesian Approach to Video Expansions on Parametric Over-Complete 2-D Dictionaries," Multimedia Signal Processing, Siena, Italy, Sep. 29-Oct. 1, 2004; 4 pages.
Escoda et al., "Video Coding Using a Deformation Compensation Algorithm Based on Adaptive Matching Pursuit Image Decompositions," International Conference on Image Processing, ICIP-2003, Barcelona, Spain, Sep. 14-17, 2003; 4 pages.

\* cited by examiner

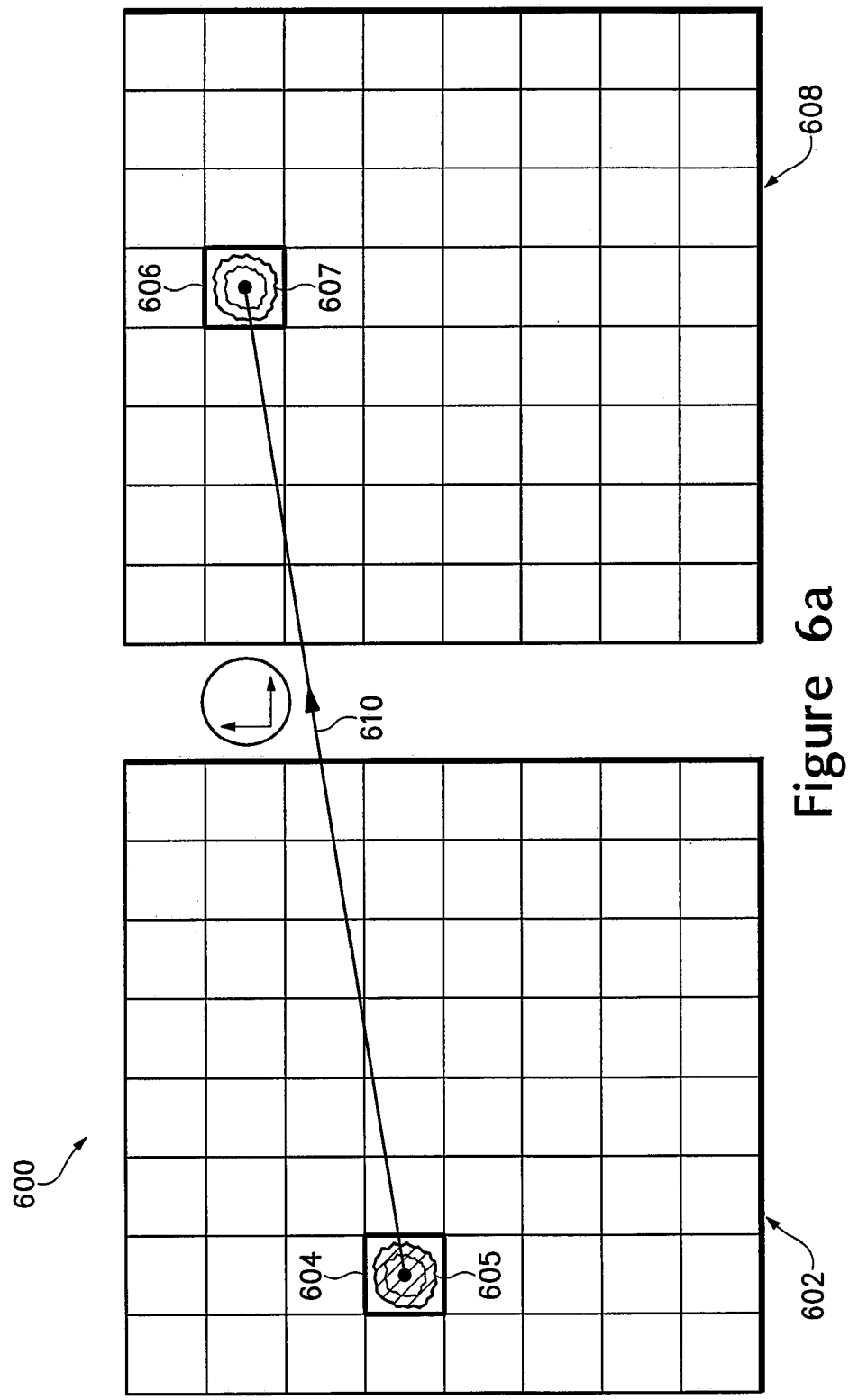

VIDEO CODING WITH EMBEDDED MOTION

CROSS REFERENCE TO RELATED APPLICATIONS

The present application is a continuation of U.S. Non-Provisional application Ser. No. 17/209,570, filed Mar. 23, 2021, which is a continuation of U.S. Non-Provisional application Ser. No. 16/729,748, filed Dec. 30, 2019, which is a continuation of U.S. Non-Provisional application Ser. No. 16/259,867, filed Jan. 28, 2019, which is a continuation of U.S. Non-Provisional application Ser. No. 11/678,479, filed Feb. 23, 2007, all of which are hereby expressly incorporated by reference in their entirety.

BACKGROUND OF THE INVENTION

Field of the Invention

Background Art

Digital video services, such as transmitting digital video information over wireless transmission networks, digital satellite services, streaming video over the internet, delivering video content to personal digital assistants or cellular phones, etc., are increasing in popularity. Increasingly, digital video compression and decompression techniques may be implemented that balance visual fidelity with compression levels to allow efficient transmission and storage of digital video content. Techniques that more resourcefully generate and/or convey motion information may help improve transmission efficiencies.

BRIEF SUMMARY OF THE INVENTION

Brief Description of the Drawings/Figures

Subject matter is particularly pointed out and distinctly claimed in the concluding portion of the specification. Claimed subject matter, however, both as to organization and method of operation, together with objects and features thereof, may best be understood by reference of the following detailed description if read with the accompanying drawings in which:

FIG. 1 depicts an example quantization method;

FIGS. 2a-d depict an example image decomposition scheme;

FIG. 3-5 are flow diagrams of a processes for video coding with embedded motion;

FIGS. 6a-c are diagrams depicting example schemes for video coding with embedded motion;

DETAILED DESCRIPTION

Figure 1:
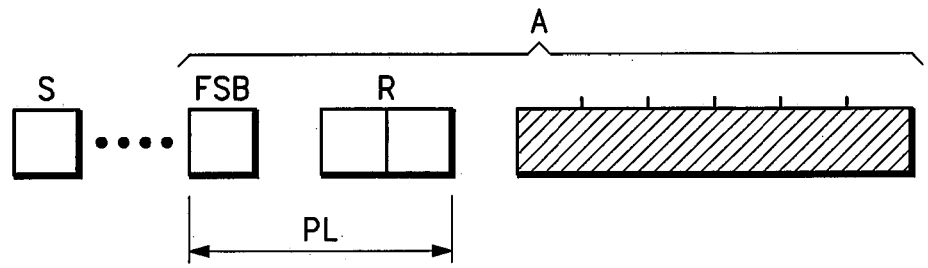

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the following detailed description are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical, magnetic and/or electromagnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

Matching pursuits (MP) processes may be used to compress one-dimensional (1D) or multi-dimensional data, including but not limited to: still images, digital images, audio, and/or video data such as digitized video reference frames and/or error frames. See, for example, S. G. Mallat and Z. Zhang, "Matching pursuits with time-frequency dictionaries", *IEEE Trans. Signal Processing*, vol. 41, pp. 3397-3415, December 1993, where MP coding was applied to ID audio signals. A MP process may include finding a full inner product between video data to be coded and members of a dictionary of basis functions. In some implementations, video data subjected to the MP process may comprise a portion of a video frame and/or image where that portion itself comprises a block and/or region of contiguous image pixels specifying image intensity and/or color in the region, although the claimed subject matter is not limited in this regard. In some implementations, a dictionary may comprise a set of Gabor functions, although the claimed subject matter is not limited in this regard.

At a position of an inner product an associated codebook index, dictionary number, or dictionary entry may describe video data locally. In some implementations, this may comprise the maximum inner product over all or part of the signal. In this sense, a particular basis function (e.g., represented by a dictionary entry) may be described as being associated with, or as representing video data. This may be referred to as an "atom."

One implementation of an MP process may be described in pseudocode as:
Initialize compute a full set of inner products
Repeat
  Find Atom. Full search or reduced complexity strategy.
  Atom Update. Subtract quantized atom from image
  Repair. Recompute required inner products only in atom footprint.
Until distortion or bit rate criterion met Amplitude of an atom may be quantized, and position, quantized amplitude, sign, and dictionary number may be assembled to form a code describing a particular Atom, for example. While the claimed subject matter is not limited to any specific atom quantization method or technique, atom quantization may be performed using a precision limited quantization (PLQ) method. All potential quantization methods now known or to be developed are intended to be included.

PLQ methods may be used with embedded coding schemes, and has been found useful in maximizing signal-to-noise in MERGE coding both with audio and video data. See, for example, D. M. Monro, J-L Aufranc, M. A. Bowers and W Poh, "Visual embedding of wavelet transform coefficients", IEEE Int. Conf. image Process. (ICIP 2000), September 2000. For example, in FIG. 1, if A comprises an amplitude of an Atom, then A may be quantized such that A may be represented by an <F, S, R> triple where: S comprises sign (A), F comprises an integer portion of $\log_2|A|$ or a First Significant Bit (FSB) of the absolute value of A, R comprises remaining bits in the range from 0 to $2^{PL-1}-1$, and where a precision limit (PL) may have values of one or greater.

An Atom identified by an MP process may be described by attributes including S, F and R values, codebook index, position of the Atom in associated video data, etc. As described in more detail hereinafter, Atom attributes may also include motion data such as motion vectors and/or motion vector corrections.

A quantized Atom may be subtracted from video data to yield a residual. Video data may then be completely and/or partially described by an Atom plus residual. In this context, an Atom may be viewed as representing a group of pixels simultaneously by approximating a region of video data with a basis function. An MP process may be repeated with new Atoms successively found and subtracted from a residual. At any stage, video data may be completely and/or partially described by codes of Atoms found and a remaining residual.

For compression, an MP process may be terminated at some stage and the codes of at least some Atoms stored and/or transmitted by a further coding process. In some implementations, a further coding process may be a lossless coding process. Other implementations may use other coding techniques, such as, for example, lossy coding techniques.

Atom attributes may be lossless coded using any of a variety of techniques. Although the claimed subject matter is not limited in scope to any particular lossless coding method, a MERGE method of lossless coding may be employed. See, for example, Monro, D. M., "Basis Picking for Matching Pursuits Image Coding", IEEE International Conference on Image Processing (ICIP 2004), Singapore, September 2004.

In MERGE coding, Atoms may, in some implementations, be gathered into groups having attributes in common, and positions of Atoms may be compressed by run length coding. MERGE coding employed in conjunction with PLQ may reduce an overall number of Atom groups coded. Because positive and negative sign values may occur with roughly equal frequency, coding an Atom's sign value as one bit of side information may further reduce the number of groups coded.

In some implementations, a MERGE process may comprise the following pseudocode:

```
For FSB from Maximum to Minimum
  For R (the amplitude Residual) from 2^PL-1 to 0
    For each Basis Function K used
      Signal by Run Length Coding the position
        of each atom with attributes (FSB, R, K).
      Send the Sign S of the atom (1 bit)
    End of Basis Function Group
  End of R (PLQ Residual) Group
End of FSB Group
```

Thus, improved embedding may be achieved by sending Atoms in order of decreasing amplitude, with codebook entry as an innermost loop. Because MERGE coding may employ adaptive run length coding it may adjust to statistics of Atom position thereby compensating for variations in the frequency of occurrence of Atom attributes.

In some implementations, an encoder may undertake a MP process to identify Atoms and may employ PLQ and/or MERGE techniques to generate coded video data including coded Atoms. A decoder may receive such coded video data including coded Atoms and reconstruct Atoms to form a lossy signal description. Again, however, the claimed subject matter is not limited with regard to how Atoms may be quantized and/or coded.

MP processes have also been applied in two-dimensions (2D) to video data coding. See, for example, R. Neff and A. Zakhor, "Very low bit rate video coding based on matching pursuits", *IEEE Trans. Circuits and Systems for Video Tech.*, vol. 7, pp. 158-171, February 1997, where MP processing was applied directly to motion compensated residual images. To avoid confusion in the following description with residuals formed in MP processes (where Atoms may be subtracted from images or previously formed residuals), a motion compensated residual image may be referred to as a Displaced Frame Difference (DFD) image, a DFD frame, or an inter-frame DFD.

In general an MP process may include repeatedly determining, for different locations or positions in a data set, full inner products between data to be coded and members of a dictionary of basis functions, and then identifying basis functions yielding largest inner products at the different positions. In some implementations, a dictionary of basis functions may comprise two-dimensional bases. Other implementations may use dictionaries comprising one-dimensional bases combined separably to form two-dimensional bases. To do this, a selected basis function may be applied to a set of data in one of its dimensions and another basis function may subsequently be applied in another dimension, the remaining dimension if the set is 2D. A dictionary of n basis functions in one dimension may provide $n^2$ combinations to form a dictionary of $n^2$ basis functions in two dimensions, for example. This may likewise be extended to any number of dimensions. Therefore, in this context, the term "separably" includes applying different basis functions to data separately.

In various implementations, MP processing may be performed on raw video data and/or transformed video data where transformed video data may comprise coefficients produced by performing spatial, temporal, or spatio-temporal transforms on raw video data. In this context, raw video data may comprise pixel values representing, for example, luminance or chrominance intensity. Further, the phrase "raw video data" includes two-dimensional (2D) video data comprising a set of adjacent pixel values in the spatial domain, while the phrase "transformed video data" includes 2D video data comprising a set of adjacent coefficients in the frequency domain. While the claimed subject matter is not limited to any specific type and/or format of video data, MP processing may be performed on wavelet transformed video data as described below. Moreover, all potential types and/or formats of video data now known or to be developed are intended to be included. For example, in some implementations, MP processing may be performed on reference and/or DFD images, transformed or otherwise.

Images may be compressed with high fidelity using 2D wavelet transformation or decomposition undertaken over several scales. See, for example, Daubechies, I., "Orthonormal bases of compactly supported wavelets", Comm. Pure Appl. Math., Vol. 41, pp 909-966, 1988; and Mallat, S., "A theory for multiresolution signal decomposition: The wavelet representation", IEEE Trans. Pattern Anal. Mach. Intel., Vol. 11, July 1989.

Wavelet decomposition may comprise application of Finite Impulse Response (FIR) Filters to separate input data into sub-sampled frequency bands. A set of FIR filters may also be termed an analysis filter bank. Once processed through an analysis filter bank, another set of filters may be employed to reconstruct input data in the original signal domain (e.g., time or space).

In 2D, decomposition may first be carried out in one dimension and then in the other dimension, yielding frequency bands termed: LL (for low pass filtered in both dimensions), HH (for high pass in both dimensions), LH (for low pass filtered in one dimension and high pass filtered in the other dimension), and HL (for high pass filtered in one dimension and low pass filtered in the other dimension). Wavelet decomposition may be carried out several times to higher levels, yielding a hierarchical structure of bands. For example, after decomposition producing HH, LH, HL and LL bands, a 2-level decomposition method may select an LL band for further transformation. FIGS. 2a through 2d are diagrams depicting an example 2-level wavelet decomposition of an image 200.

Figure 2A:
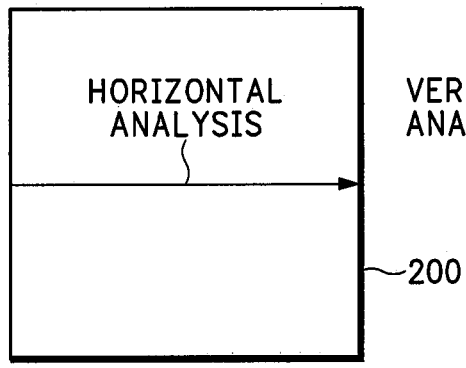
Figure 2B:
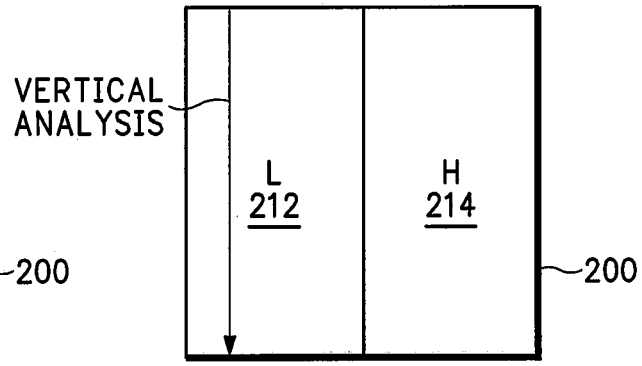

As depicted in FIG. 2a, analysis may begin in a horizontal direction. Other implementations may begin an analysis in a vertical direction, or in another direction. Horizontal analysis may result in image data being subdivided into two sub bands. A resulting low pass band (containing lower frequency image information) is depicted as area 212 in FIG. 2b, and a resulting high pass sub band (containing higher frequency image information) is depicted as area 214. Also, as depicted in FIG. 2b, analysis may be performed in a vertical direction on image 200.

Figure 2C:
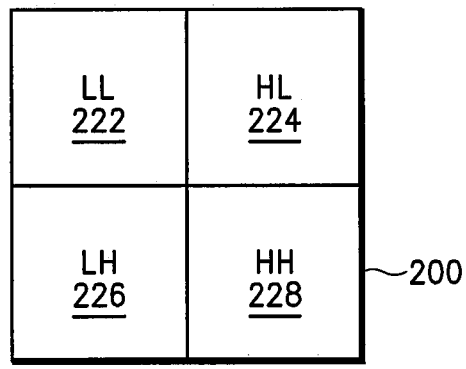

FIG. 2c shows the results of horizontal and vertical analyses. Image 200 may be divided into four sub bands. LL sub band 222 and HL sub band 224 comprise, respectively, data low pass filtered in both horizontal and vertical directions, and data high pass filtered in the horizontal direction and low pass filtered in the vertical direction. While LH sub band 226 and HH sub band 228 comprise, respectively, data low pass filtered in the horizontal direction and high pass filtered in the vertical direction, and data high pass filtered in both horizontal and vertical directions. Thus, LL sub band 222 may include gross or low frequency image information, and bands HL 224, LH 226, and HH 228 may include detailed or high frequency information providing additional image detail. Claimed subject matter is not limited in scope to filtered image data. Further, in implementations employing filtered image data, claimed subject matter is not limited in scope to linear filtering of images, and thus, for example, in some implementations, nonlinear filtering may be undertaken.

Figure 2D:
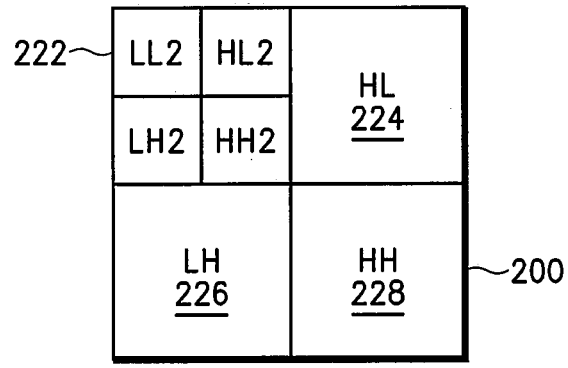

For wavelet transformation, benefits may be obtained by repeating a decomposition process one or more times. For example, LL band 222 may be further decomposed to produce another level of sub bands LL2, HL2, LH2, and HH2, as depicted in FIG. 2d. Each level of decomposition may be referred to as a wavelet scale. Thus, image 200 of FIG. 2d may be said to have undergone wavelet transformation over two scales.

Other implementations may include wavelet transformation over different numbers of scales and with different numbers of bands. See, for example, P. Steffen et al "Theory of Regular M-Band Wavelets" in IEEE Transactions on Signal Processing, Vol. 41, pp. 3497-3511, 1992. In addition, bands other than LL may be further decomposed. See, for example, K. Ramchandran and M. Vetterli, 'Best wavelet packets in a Rate-Distortion Sense', IEEE Transactions on Image Processing, Vol. 2, pp. 160-175, 1993. In some implementations, such as for still images or reference frames, a wavelet transformation may be performed over five scales, while for DFD images a wavelet transformation may be performed over two scales. The claimed subject matter is not, however, limited in scope to any particular decomposition method and/or level of scaling. Thus, all potential decomposition methods and/or schemes now known or to be developed are intended to be included.

In some implementations, a wavelet transformation process may be performed prior to application of a ID or 2D MP process. Such pre-transformation by wavelet decomposition may improve coding efficiency of both DFD and still images by either ID or 2D MP processes. See, for example, Monro, D. M., "Basis Picking for Matching Pursuits Image Coding", IEEE International Conference on Image Processing (ICIP 2004). Singapore, September 2004. As noted above, for DFD images, wavelet transformation may be undertaken over one or two scales, while for still images, transformation may be undertaken over four or five scales. See, for example, Yuan Yuan and Monro., D. M., "Improved Matching Pursuits Image Coding", IEEE International Conference on Acoustics, Speech and Signal Processing ICASSP 2005, Philadelphia, March 2005.

Undertaking wavelet transformation prior to performing MP processing may be termed a hybrid Wavelet/Matching Pursuits method where first applying a wavelet transform may yield data more suitable for subsequent application of an MP process. Several parameters may affect image fidelity of data compressed by hybrid Wavelet/Matching Pursuits methods with MERGE/PLQ coding, including but not limited to: choice and size of codebook, number of wavelet scales, value of PL, and/or an order in which wavelet coefficients are scanned. Further, any particular combination of parameters may be image dependent. The claimed subject matter is not, however, limited in scope to decomposed image data nor in scope to image data decomposed according to any particular decomposition method. Thus, all potential decomposition methods now known or to be developed are intended to be included.

Motion compensation may be used to improve video data compression. Overall, a multitude of schemes exist for implementing motion compensated video compression and the claimed subject matter is not limited to any particular motion compensation schemes. In general, motion compensation permits portions of a predicted video frame to be assembled from portions of a reference frame and associated motion data, such as motion vectors, describing the displacement of those reference frame portions with respect to the predicted frame. A reference frame may also be termed an intra-frame or "I" frame. Thus, for example, a motion vector may describe how a particular portion of a reference frame may be displaced horizontally and/or vertically with respect to a subsequent predicted frame. Motion data may also include motion vector corrections that may be used to adjust previously provided or determined motion vectors. Reference frames and predicted frames may comprise adjacent frames in a video sequence or they may be spaced apart temporally in a video sequence. Many arrangements of reference and predicted frames may be used and the claimed subject matter is not limited in scope to any particular arrangement.

An encoder may generate motion data and convey that motion data to a decoder, which may use the motion data to generate at least portions of a coarse predicted frame from portions of a reference frame. In the process of generating motion data associated with a reference frame, an encoder may also generate a DFD frame describing the difference between a reference frame and at least portions of a coarse predicted frame and may also convey that DFD frame to a decoder which may, in turn, use a DFD frame to generate at least portions of a predicted frame from corresponding portions of a coarse predicted frame.

As described in more detail hereinafter, a method is described for associating motion information with Atoms which may provide better bit rate scalability and which may reduce the quantity of compressed video data transmitted by, for example, a video transmission system including an encoder communicatively coupled to a decoder. Claimed subject matter is not, however, limited in scope to video transmission systems and, thus, other implementations may include video encoding systems and/or devices employing methods described herein to produce video data to be stored or held in storage media (e.g., memory, compact disc(s), etc.). The phrase "associating motion information with Atoms" includes identifying a motion vector as indicating displacement of a particular Atom from one image frame to another image frame. Motion information or data associated with an Atom may also be described as being related to that Atom or as representing displacement of that Atom.

Figure 3:
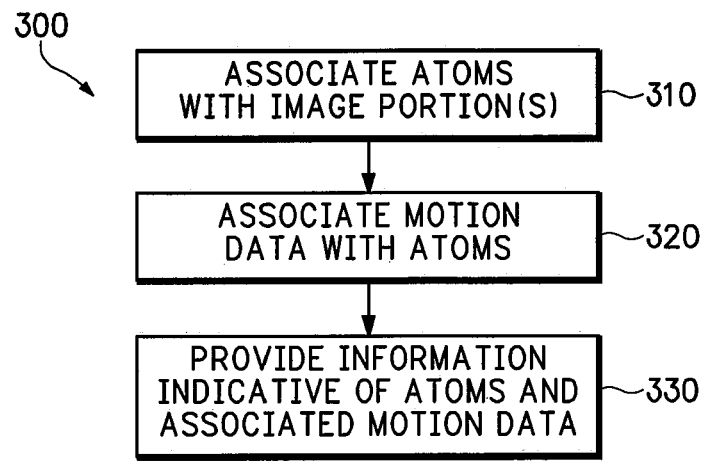

FIG. 3 is a flow diagram of a process 300 for video coding with embedded motion. In block 310, Atoms may be associated with or identified as representative of portions of an image. Portions of an image in block 310 may comprise portions of a reference image or portions of a DFD image. At block 320, motion data may be associated with Atoms. In block 330, information indicative of Atoms and associated motion data may be provided. In some implementations, an Atom may comprise a Gabor basis function although the claimed subject matter is not limited in scope to particular basis function types. Process 300 may yield more efficient compression of video data. The example implementation of FIG. 3 may include all, more than all, and/or less than all of blocks 310-330, and furthermore the order of blocks 310-330 is merely an example order, and the scope of the claimed subject matter is not limited in this respect.

Figure 4:
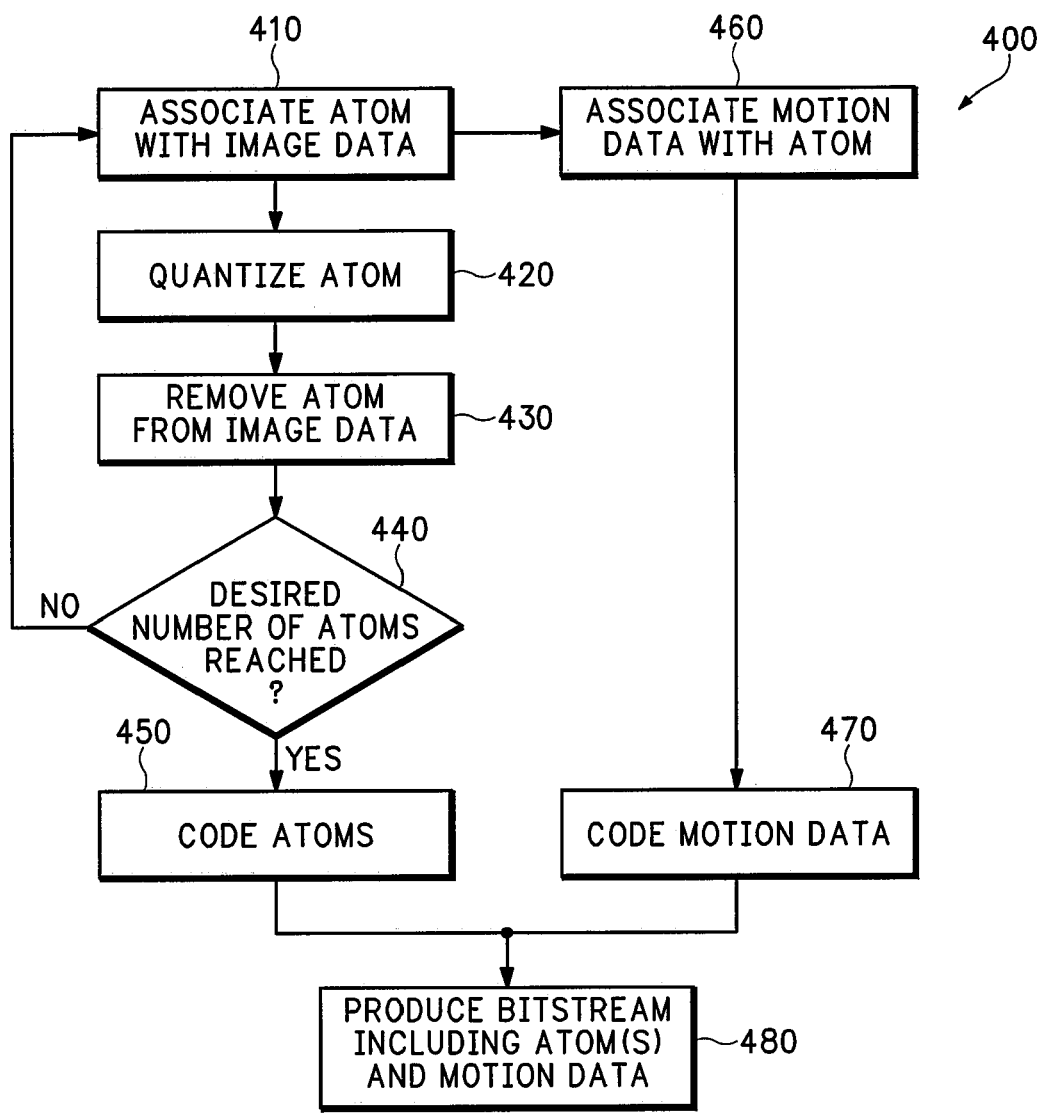

FIG. 4 is a flow diagram of a process 400 for video coding with embedded motion. At block 410 an. MP process begins. For this example implementation, an MP process may comprise blocks 410 through 450. At block 410, an Atom may be selected as representing image data. In this context, the phrase "selected as representing" includes associating an Atom with image data. Image data may comprise a portion of a reference image, a portion of a DFD image, or a portion of another type of image frame. Further, image data may comprise raw image data (e.g., spatial domain pixel values) or transformed image data (e.g., frequency domain wavelet transformed image data). As noted above, claimed subject matter is not, however, limited to a particular type and/or format of image data.

An atom of block 410 may be determined by finding a full inner product between image data and members of a dictionary of basis functions, such as Gabor functions. At block 420, an Atom of block 410 may be quantized. While claimed subject matter is not limited to any particular quantization method or technique, Atoms may be quantized in block 420 using a PLQ method as described above.

At block 430, an Atom determined at block 410 and quantized at block 420 may be removed from image data. At block 440, a determination may be made as to whether a desired number of atoms has been reached. A desired number of atoms may be based on any of a range of considerations, including, but not limited to, image quality and bit rate. If a desired number of atoms have not been reached, processing may return to block 410 where another Atom may be determined.

A process of determining an Atom may include finding a full inner product between members of the dictionary of basis functions and an image data residual formed after the removal of a previously identified Atom. In another implementation, rather than recalculating all, or nearly all, of such inner products, inner products from a region of an image data residual surrounding a previously identified Atom position may be calculated. Blocks 410 through 440 may be repeated until the desired number of atoms has been reached. Each instance of block 410 may comprise identifying an Atom for a particular and/or separate portion of an image. Once a desired number of atoms have been reached, Atoms may be coded at a block 450. While the claimed subject matter is not limited to any particular coding method or technique, atoms may be coded in block 450 using a MERGE method as described above.

In block 460, motion data may be determined for an Atom associated with image data in block 410. As discussed above, a variety of motion estimation techniques may be employed to determine motion data for atoms and claimed subject matter is not limited to any particular motion estimation method or technique. In block 470, motion data may be coded using any one of a wide range of encoding techniques, the claimed subject matter not being limited in scope in this regard. At block 480, a bitstream may be produced which includes coded atoms and associated coded motion data. The claimed subject matter is not, however, limited to any particular bitstream schemes, protocols and/or formats and, thus, a bitstream may be produced in block 480 in accordance with any one of a variety of bitstream schemes, protocols and/or formats. Further, a bitstream produced in block 480 may intersperse coded Atoms with associated coded motion data in any manner that permits any particular coded Atom to be associated with corresponding coded motion data that specifies motion of that particular Atom. While, in some implementations, a bitstream may be produced in block 480, in other implementations, Atoms (coded or otherwise) and associated motion data (coded or otherwise) may be stored in addition to or instead of being formed into a bitstream.

In accordance with some implementations of the claimed subject matter, an Atom determined in block 410 may be associated with image data comprising a portion of a reference frame or a DFD frame. Block 460 may comprise searching subsequent frames to determine whether image data in a subsequent frame may be similar enough that an Atom determined in block 410 and associated with a portion of a reference or a DFD frame may be used by a decoder, in conjunction with a associated motion data determined in block 460, to construct a portion of a subsequent frame (e.g., a predicted frame or a DFD frame). In some implementations, motion data of block 460 associated with an Atom of block 410 may comprise a motion vector correction and a decoder may use such motion data to correct a predicted motion vector.

In accordance with some implementations of the claimed subject matter, block 460 may comprise searching subsequent frames to determine whether image data in a subsequent frame corresponding to a portion of an image frame may be similar enough to a portion of a reference frame that an Atom determined in block 410 may be used by a decoder to construct a portion of a subsequent frame (e.g., a predicted frame) by adding a portion of an image frame to a portion of a reference frame indicated by motion data determined in block 460. In some implementations, motion data of block 460 associated with an Atom of block 410 may comprise a motion vector correction and a decoder may use such motion data to correct a previously provided, determined or predicted motion vector.

In some implementations of the claimed subject matter, block 480 may comprise placing or positioning motion data of block 460 in a bitstream immediately before or immediately after an associated Atom determined in block 410. In other implementations, block 480 may comprise placing or positioning motion data of block 460 in a bitstream in such a manner that a decoder may associate the motion data with an Atom determined in block 410. Thus, for example, in various implementations of block 480, specific coded motion data may be pre-fixed or post-fixed to a particular associated coded Atom in a bitstream. Alternatively, specific coded motion data may be placed anywhere in a bitstream and flagged or otherwise identified in a bitstream in such a manner that it may be associated with a particular coded atom elsewhere in the bitstream. In some implementations, means may be provided that enable an encoder to inform a decoder whether motion data associated with an Atom comprises a motion vector or a correction to a motion vector. Further, in some implementations, means may be provided that enable an encoder to inform a decoder that a motion vector predicted by the decoder may be used without correction and, hence, that a particular Atom may be transmitted in a bitstream without associated motion data. Again, however, claimed subject matter is not limited in scope to transmitting Atoms and associated motion data. Thus, in some implementations, an encoder may store Atoms and associated motion data in storage media (e.g., in a memory, on a hard-drive, on a compact disc, etc.).

The example implementation of FIG. 4 may include all, more than all, and/or less than all of blocks 410-480, and furthermore the order of blocks 410-480 is merely an example order, and the scope of the claimed subject matter is not limited in this respect. For example, blocks 410-440 may be undertaken separately from block 450. Likewise, block 460 may be undertaken separately from block 470. Further, block 480 may be undertaken separately from any of blocks 410-450 and/or 460-470.

Figure 5:
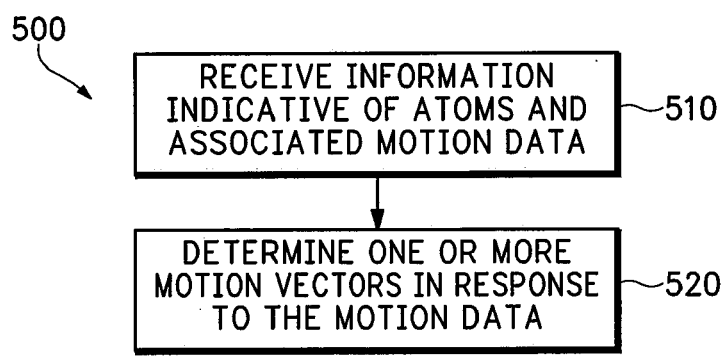

FIG. 5 is a flow diagram of a process 500 for video decoding with embedded motion. At block 510, a bitstream may be received that includes information indicative of Atoms and information indicative of associated motion data. The Atoms may comprise Gabor functions. At block 520, one or more motion vectors may be determined in response to the motion data. The example implementation of FIG. 5 may include all, more than all, and/or less than all of blocks 510-520, and furthermore, the order of blocks 510-520 is merely an example order, and the scope of claimed subject matter is not limited in this regard.

Block 520 may be undertaken by having a decoder decode motion data received in a bitstream at block 510, and determine a motion vector from the decoded motion data. In some implementations, an Atom may refer to a portion of a reference frame and an associated motion vector may specify displacement of an Atom with respect to a predicted frame or a DFD frame. In other implementations, a decoder may have previously predicted a motion vector specifying displacement of a portion of a reference frame referred to by an Atom, and, hence, motion data associated with an Atom may specify a correction to a motion vector previously predicted by a decoder.

Figure 6B:
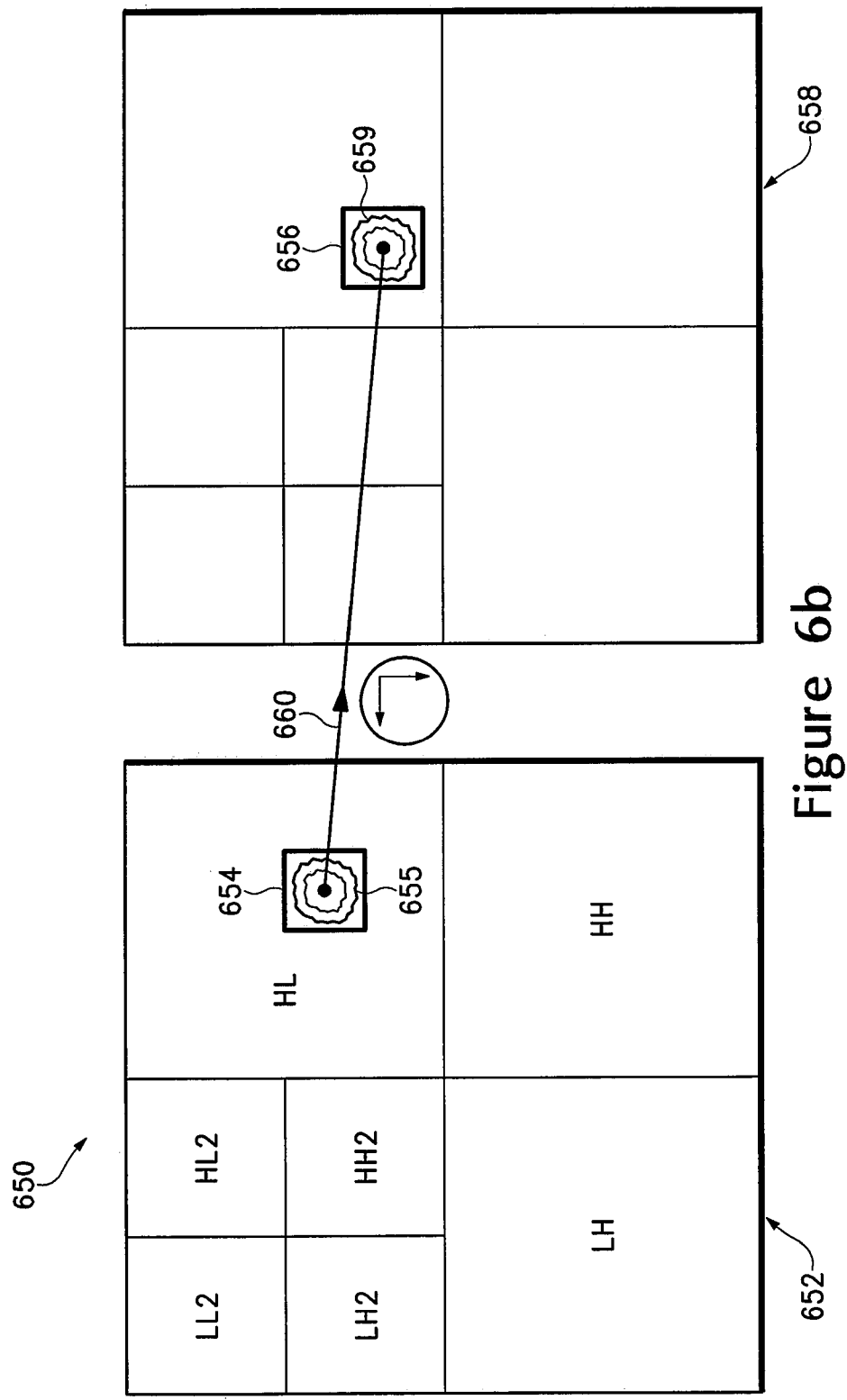
Figure 6C:
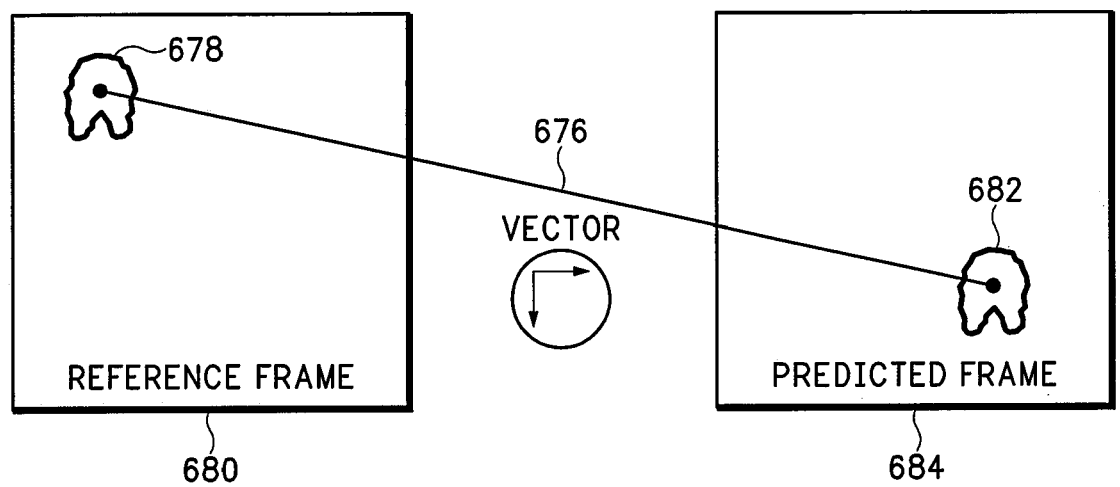
Figure 6C:
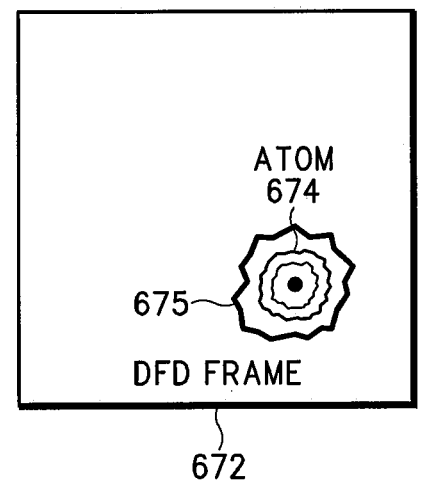

FIGS. 6a-c depict respective example video coding schemes 600, 650 and 670. Schemes 600, 650 and 670 are provided solely for the purposes of explanation and no arrangement, structure and/or illustration of any quantities and/or elements in FIGS. 6a-c such as video frames, image portions, motion vectors, etc., should be construed to limit the claimed subject matter in any way.

In scheme 600, an example reference video frame 602 comprising raw image data includes a portion 604 represented by a particular Atom 605. A motion vector 610 may represent displacement of Atom 605 with respect to a portion 606 of a subsequent predicted frame 608. When defining, producing and/or determining Atom 605, an encoder may also define, produce and/or determine associated vector 610. Thus, for example, vector 610 may indicate that a decoder should produce an Atom 607 representing portion 606 by replicating Atom 605 representative of portion 604. A decoder may do so by, for example, obtaining Atom 607 from a dictionary.

In scheme 650, an example reference video frame 652 comprising wavelet transformed image data includes a portion 654 represented by a particular Atom 655. A motion vector 660 may describe displacement of Atom 655 with respect to a portion 656 of a subsequent predicted frame 658. When defining, producing and/or determining Atom 655, an encoder may also define, produce and/or determine associated vector 660. Thus, for example, vector 660 may indicate that a decoder should produce an Atom 659 representing portion 656 by replicating Atom 655 representing portion 654. While FIG. 6b depicts frames 652 and 658 as comprising two scale wavelet transformed image data, the claimed subject matter is not limited to a particular image data type and/or format. Thus, for example, in other implementations, frames 652 and 658 might comprise "m" band wavelet transformed image data, wavelet packet transformed image data, etc.

In scheme 670, a DFD frame 672 may include an Atom 674 and an associated motion vector 676 where vector 676 represents displacement of a portion 678 of a reference video frame 680 with respect to a portion 682 of a predicted frame 684 and an associated portion 675 of DFD frame 672. Frames 672, 680 and 684 may comprise either raw or transformed image data, the claimed subject matter not being limited in scope to any particular type or format of image data. When defining, producing and/or determining Atom 674, an encoder may also define, produce and/or determine associated vector 676. Thus, for example, vector 676 may indicate that a decoder should produce portion 682 of predicted frame 684 by replicating image data of portion 678 of reference frame 680 before adjusting portion 682 with Atom 674 of DFD frame.

While schemes 600, 650 and 670 depict motion vectors indicating how atoms may be displaced from one frame to another frame, in some implementations corrections to motion vectors may be supplied instead and/or in addition to motion vectors. For example, a predicted motion vector indicating how an Atom may be displaced from frame 602 to frame 608 may already exist (e.g., may be already known to a decoder) and scheme 600 may involve providing a correction to that predicted motion vector.

In some implementations of the claimed subject matter, an encoder and/or encoding system may assemble and transmit a bitstream that includes coded reference frames, coded Atoms associated with other image frames, such as DFD frames, and coded motion vectors- and/or motion vector corrections associated with the coded Atoms. Such a bitstream may intersperse and/or interleave coded Atoms with associated coded motion vectors and/or motion vector corrections. The claimed subject matter is not, however, limited in scope to interspersing and/or interleaving coded Atoms with associated coded motion vectors and/or motion vector corrections in a transmitted bitstream. Thus, in other implementations, information including coded Atoms interspersed and/or interleaved with associated coded motion vectors and/or motion vector corrections may be stored before, during and/or instead of being transmitted.

In further implementations of the claimed subject matter, an encoder may employ means to inform a decoder that coded motion data transmitted in a bitstream represents raw motion vectors, corrections to motion vectors such as motion vectors predicted by a decoder, and/or that no motion data is to be associated with a particular coded Atom. For example, in some cases, an encoder may not associate motion data with a particular coded Atom because a prediction subsequently made by a decoder may be sufficient. Means to do so may comprise transmitting additional information along with a coded Atom so that a decoder may use that additional information to determine whether coded motion data also transmitted represents a raw motion vector for that Atom, a correction to predicted motion vector for that Atom, or whether no motion data has been transmitted for that particular Atom.

Figure 7:
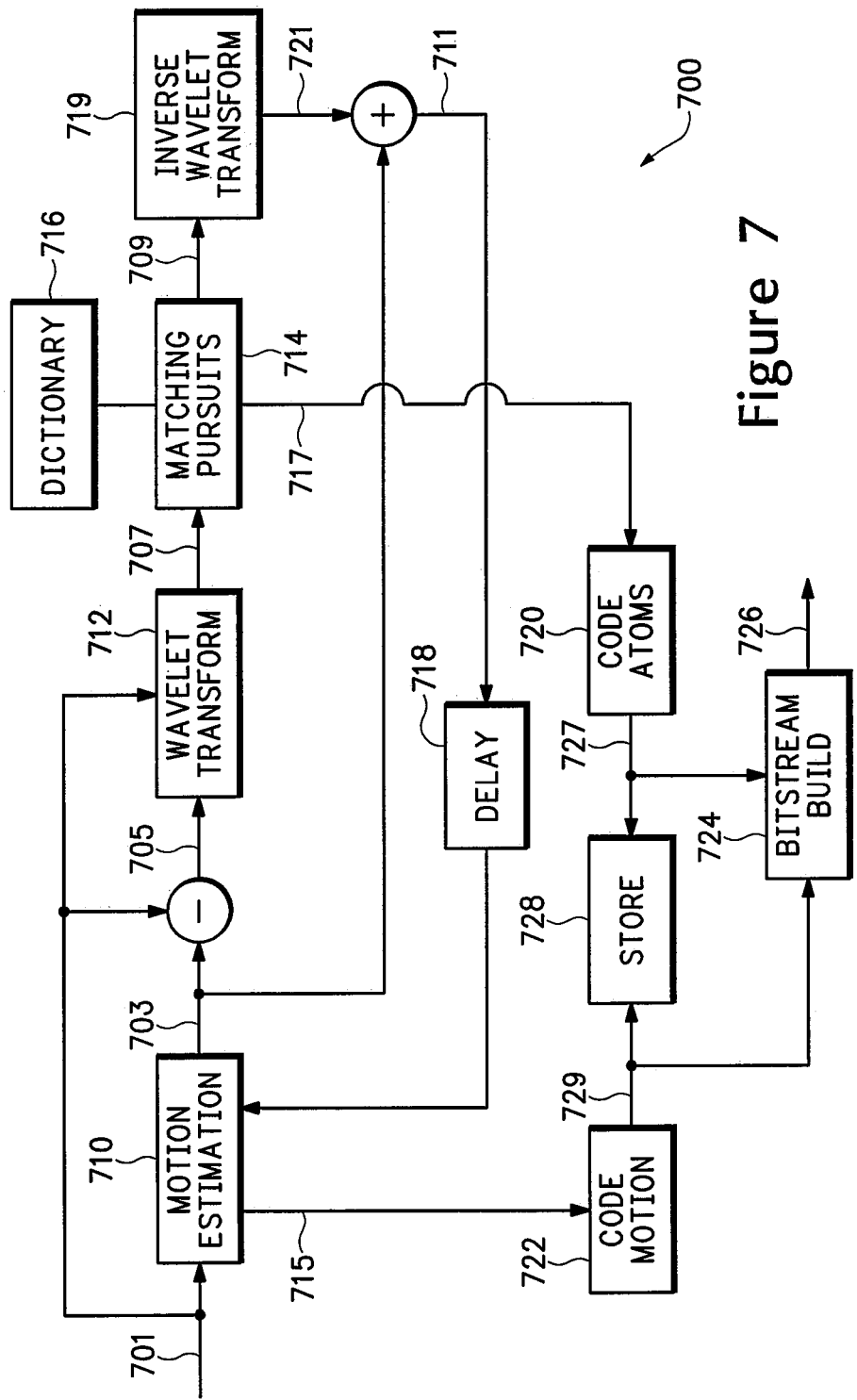
FIG. 7 is a block diagram of an example encoding system.

FIG. 7 is a block diagram of an example video encoding system 700, such as may be used to encode any of schemes 600, 650 and/or 670. Encoding system 700 may be included in any of a wide range of electronic devices, including digital cameras, digital video cameras or other image forming devices, although the claimed subject matter is not limited in this respect. Encoding system 700 may receive data 701 for a current original image. For this example implementation, current original image 701 may comprise a frame from a digital video stream or sequence of image frames. A motion estimation block 710 may receive current original image 701. Motion estimation block 710 may perform motion compensation on image 701 to produce motion data 715 and prediction image data 703. Motion data 715, which may include motion vectors and/or motion vector corrections, may be encoded by a code motion block 722 to produce coded motion data 729. The claimed subject matter is not limited in scope to any particular method used to encode motion data. Prediction data 703 may be subtracted from current original image data 701 to form a DFD image 705.

DFD image 705 and/or original image 701 may be received at a wavelet transform block 712. Wavelet transform block 712 may perform a wavelet decomposition of DFD image 705 and/or original image 701 and provide a resulting output 707 to an MP block 714. A wavelet decomposition undertaken by wavelet transform block 712 may comprise a scaled wavelet transform (e.g., similar to that depicted in FIGS. 2a through 2d), an "m" band wavelet transform, or a wavelet packet transform to name several common transform schemes although the claimed subject matter is not limited in this respect. The claimed subject matter is not limited, however, to wavelet transforming output of motion estimation block 710. Thus, for example, in some implementations, a DFD image 705 and/or original image 701 comprising raw image data may be provided directly to MP block 714 without first being wavelet transformed.

MP block 714 may perform an MP process on wavelet transformed output 707. An MP process may be implemented in a manner similar to that discussed above in connection with FIG. 4, although the claimed subject matter is not limited in this respect. In undertaking an MP process, MP block 714 may identify an Atom selected from a dictionary 716, and may construct a series or set of associated Atom parameters 717 which may be delivered to a code atoms block 720. In doing so, MP block 714 may undertake a PLQ quantization method, similar, for example, to that described above, to quantize an Atom's amplitude and provide an (F, S, R) triple as part of Atom parameters 717. The claimed subject matter is not, however, limited to any particular quantization method. Atom parameters 717 may include, but are not limited to: a (F, S, R) triple, a codebook index, and/or a position of an Atom in image data.

Code atoms block 720 may encode atom parameters 717 to produce coded Atoms 727 for images 701 and/or 705 using any of a wide range of encoding techniques. In this context, a particular coded Atom 727 includes coded Atom parameters (e.g., attributes such as a dictionary entry, etc.) that may be decoded by a decoder and used to assemble a corresponding Atom as will be described in greater detail below.

In some implementations, block 720 may employ a MERGE coding scheme, similar to that described above, to encode atom parameters 717, although the claimed subject matter is not limited in this regard. MP block 714 may also produce a coded image approximation 709 that may be delivered to an inverse wavelet transform block 719. Coded image approximation 709 may comprise data (e.g., coefficients) remaining after MP. block 714 removes Atoms from either wavelet transformed output 707 or images 701/705. Inverse wavelet transform block 719 may provide an output 721 that may be added to motion prediction 703 to form a current reconstruction 711. In implementations where MP block 714 processes DFD image 705, coded image approximation 709 may be directly added to motion prediction 703 to form current reconstruction 711. In implementations where MP block 714 processes raw image 701 or predicted image 703, coded image approximation 709 may be the same as current reconstruction 711 without further processing. Current reconstruction 711 may be delayed by a delay block 718 before being provided to motion estimation block 710 to be used in connection with motion estimation operations for a next original image.

Coded atoms 727 from block 720 and coded motion data 729 from block 722 may be delivered to a bitstream build block 724. Block 724 may produce a bitstream 726 that includes one or more coded Atoms and associated coded motion data. Bitstream 726 may be transmitted to any of a wide range of devices, such as devices incorporating video decoders, using any of a wide range of interconnect technologies, including wireless interconnect technologies, the Internet, local area networks, etc., although the claimed subject matter is not limited in this respect. In other implementations, coded atoms 727 from block 720 and coded motion data 729 from block 722 may be stored in store block 728 in addition to or instead of being provided to bitstream build block 724.

A coded Atom and its associated coded motion may be placed, organized or located in bitstream 726 in a variety of ways that may permit a decoder and/or decoding system to identify them. For example, in various implementations, coded Atoms and coded motion data may be interleaved or interspersed in bitstream 726. In this context, the term "interspersed" may mean placing coded Atoms at intervals, regular or otherwise, in a bitstream in or among coded Motion data associated with the coded Atoms. The claimed subject matter is not, however, limited by the manner in which the coded Atoms and associated coded motion data are organized or placed among each other in a bitstream. Thus, in various implementations, coded motion data may be positioned in a bitstream immediately before an associated coded Atom, positioned immediately after an associated coded Atom, or placed elsewhere in a bitstream in a manner that permits coded motion data to be associated with a related coded Atom.

The various blocks and units of encoding system 700 may be implemented using software, firmware, and/or hardware, or any combination of software, firmware, and hardware. Further, although FIG. 7 depicts an example system having a particular configuration of components, other implementations are possible using other configurations. An encoder or encoding system, such as system 700, may employ any of a number of well-known motion compensation methods for determining motion vectors and/or corrections to motion vectors. The claimed subject matter is not limited in scope to any particular motion compensation method. Again, as discussed above, while system 700 includes a wavelet transformation scheme, other implementations are possible without wavelet transformation.

A decoder and/or a decoding system may receive and decode a bitstream that includes coded reference frames, coded Atoms, and coded motion vectors and/or motion vector corrections associated with the coded Atoms. A decoder may then use decoded Atoms and associated motion vectors to generate predicted video frames. Alternatively, a decoder may use decoded Atoms and associated motion vector corrections to correct either previously transmitted motion vectors, or to correct motion vectors predicted by a decoder.

Figure 8:
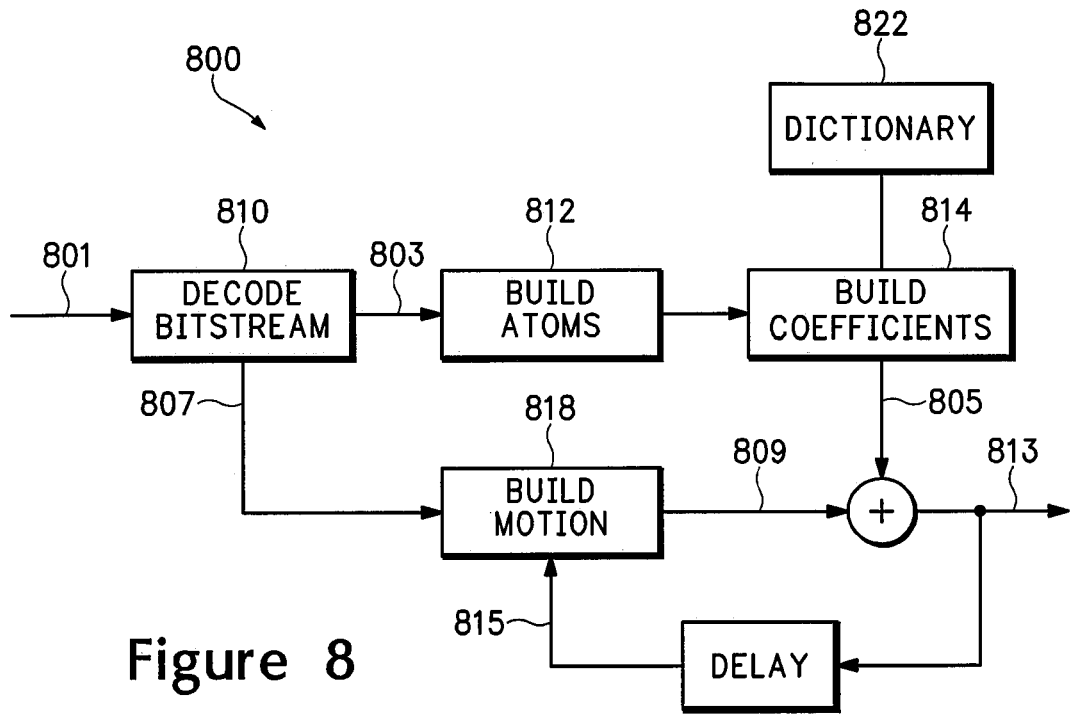
FIG. 8 is a block diagram of an example decoding system.

FIG. 8 is a block diagram of an example decoding system 800 such as might be used to decode any of schemes 600, 650 and/or 670. Decoding system 800 may be included in any of a wide range of electronic devices, including cellular phones, computer systems, or other image viewing devices, although the claimed subject matter is not limited in this respect. A decode bitstream block 810 may receive a bitstream 801 including coded Atoms and associated coded motion data. Decode bitstream block 810 may provide decoded Atom parameters 803 to a build atoms block 812 and also provide decoded motion data 807 including motion vectors and/or motion vector corrections to a build motion block 818.

Build atoms block 812 may receive coded Atom parameters 803 and may provide decoded atom parameters to a build coefficients block 814. In some implementations such as scheme 600 or 650, motion information 807 may be provided to build atoms block 812 and/or build coefficients block 814. In some implementations, block 814 may produce wavelet transform coefficients in response to decoded atom parameters. In such implementations, block 814 may also undertake an inverse wavelet transform on wavelet transform coefficients using one of a large variety of inverse wavelet transform schemes. As discussed previously, the claimed subject matter is not, however, limited to wavelet transformed data. Thus, in some implementations, decoded Atom parameters provided to build coefficients block 814 represent non-transformed image data. Regardless, block 814 may use Atom parameters and a dictionary 822 to reconstruct coefficients comprising an image 805.

In some implementations, build motion block 818 may receive decoded motion data 807 in the form of motion vectors and/or motion vector corrections, and may, in response, create motion compensation data 809 that may be added to image 805 to form a current reconstruction image 813. Image 813 may be delayed by a delay block 820 prior to being provided as a previous reconstruction image 815 to build motion block 818 to be used in the construction of motion prediction information.

The various blocks and units of decoding system 800 may be implemented using software, firmware, and/or hardware, or any combination of software, firmware, and hardware. Further, although FIG. 8 depicts an example system having a particular configuration of components, other implementations are possible using other configurations. A decoder and/or decoding system, such as system 800, may employ any of a number of well-known motion compensation methods for using motion vectors and/or corrections to motion vectors to determine or predict image frames. The claimed subject matter is not limited in scope to any particular motion compensation method.

In accordance with some implementations of the claimed subject matter, a video encoder, such as, for example, system 700, may transmit to a video decoder, such as, for example, system 800, coded parameters specifying an Atom and/or Atoms in an embedded manner along with. code(s) specifying motion data associated with an Atom and/or Atoms. A transmission may take the form of a bitstream that interleaves and/or intersperses motion data code(s) with associated Atom code(s).

Thus, referring to FIGS. 3, 7, and 8, in some implementations of the claimed subject matter, process 300 may be undertaken by having a video encoder, such as system 700, perform, at block 310, an MP process on a video frame such as a reference frame or a DFD frame. In this context, block 320 may be undertaken by having an encoder determine motion data describing displacement of particular Atoms associated with portions of a frame with respect to a subsequent frame, and then identify such motion data as being associated with those particular Atoms. Block 330 may comprise having an encoder encode both the motion data and the associated Atoms and then generate a bitstream that intersperses coded motion data with coded Atoms in such a manner that coded Atoms may subsequently be associated with coded motion data by a decoder, such as system 800.

Moreover, referring to FIGS. 5, 7, and 8, in some implementations of the claimed subject matter, process 500 may be undertaken by having a video decoder, such as system 800, receive, at block 510, a bitstream that intersperses coded motion data with associated coded Atoms codes. Block 520 may be undertaken by having a—decoder decode a bitstream, determine a motion vector or a correction to a motion vector from the decoded motion data, and associate that motion vector or motion vector correction with a particular Atom. When decoded motion data comprises a raw motion vector, a decoder may determine a motion vector by extracting it from a bitstream. When decoded motion data comprises a correction to a motion vector, a decoder may determine a motion vector by extracting motion vector correction data from a bitstream and using it to adjust or modify a predicted motion vector previously determined by a decoder.

Figure 9:
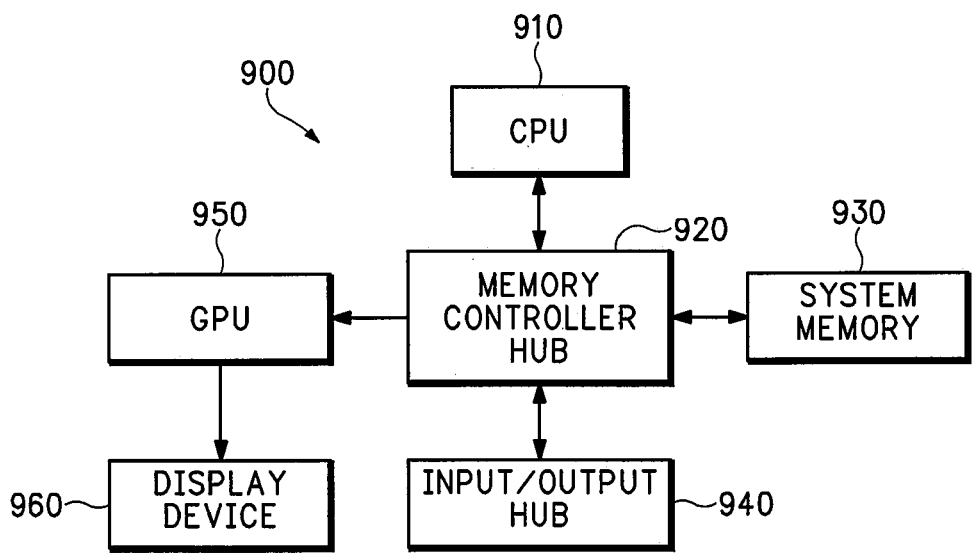
FIG. 9 is a block diagram of an example computer system.

FIG. 9 is a block diagram of an example computer system 900. System 900 may be used to perform' some or all of the various functions discussed above in connection with FIGS. 1-8. System 900 includes a central processing unit (CPU) 910 and a memory controller hub 920 coupled to CPU 910. Memory controller hub 920 may be further coupled to a system memory 930, to a graphics processing unit (GPU) 950, and/or to an input/output hub 940. GPU 950 may further be coupled to a display device 960, which may comprise a cathode ray tube (CRT) display, a flat panel liquid crystal display (LCD), or other type of display device. Although example system 900 is shown with a particular configuration of components, other implementations are possible using any of a wide range of configurations.

It will, of course, be understood that, although particular implementations have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the implementations previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Also, as used herein, the article "a" includes one or more items. Moreover, when terms or phrases such as "coupled" or "responsive" or "in response to" or "in communication with" are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

What is claimed is:

1. A method, comprising:
receiving image data comprising a sequence of one or more image frames, wherein the one or more image frames includes a first image frame;
applying a motion data estimate to the first image frame to generate a second image frame, wherein the motion data estimate is based on a reconstruction image;
subtracting the second image frame from the first image frame to generate a difference image frame;
performing a wavelet transform on the first image frame and the difference image frame to generate a wavelet-transformed first image frame and a wavelet-transformed difference image frame;
identifying a first basis function plus a residual that represents at least, in part, a first portion of the wavelet-transformed first image frame;
identifying a second portion of the wavelet-transformed difference image frame that is represented at least by the first basis function;
generating the reconstruction image using a sum of the second image frame and an inverse wavelength transform applied to the residual; and
associating the motion data estimate with the first basis function;
wherein the first portion includes two or more pixels of the first image frame,
wherein the second portion includes two or more pixels of the wavelet-transformed difference image frame, and
wherein the first basis function is selected from a dictionary of basis functions.

2. The method of claim 1, further comprising:
producing a bitstream including information indicative of the first basis function with information indicative of the motion data estimate.

3. The method of claim 2, wherein the information indicative of the first basis function comprises a coded atom.

4. The method of claim 3, wherein the bitstream also includes additional information associated with the coded atom, the additional information indicative of whether the motion data estimate associated with the coded atom comprises one of a motion vector or a correction to the motion vector.

5. The method of claim 1, wherein the motion data estimate comprises a motion vector.

6. The method of claim 1, wherein the associating motion data estimate with the first basis function comprises predicting the motion data based on the first basis function.

7. The method of claim 1, wherein the motion data estimate comprises a correction to a motion vector.

8. The method of claim 1, wherein the identifying the first basis function that represents at least, in part, the first portion of the wavelet-transformed first image frame comprises performing a matching pursuits process on the wavelet-transformed first image frame.

9. An apparatus, comprising:
an encoder comprising a processor and a memory, the encoder adapted to:
receive image data comprising a sequence of one or more image frames, wherein the one or more image frames includes a first image frame;
apply a motion data estimate to the first image frame to generate a second image frame, wherein the motion data estimate is based on a reconstruction image;
subtract the second image frame from the first image frame to generate a difference image frame;
perform a wavelet transform on the first image frame and the difference image frame to generate a wavelet-transformed first image frame and a wavelet-transformed difference image frame;
identify a first basis function plus a residual that represents at least, in part, a first portion of the wavelet-transformed first image frame;
identify a second portion of the wavelet-transformed difference image frame that is represented at least by the first basis function;
generate the reconstruction image using a sum of the second image frame and an inverse wavelength transform applied to the residual; and
associate the motion data estimate with the first basis function;
wherein the first portion includes two or more pixels of the first image frame,
wherein the second portion includes two or more pixels of the wavelet-transformed difference image frame, and
wherein the first basis function is selected from a dictionary of basis functions.

10. The apparatus of claim 9, wherein the encoder is further adapted to produce a bitstream including information indicative of the first basis function with information indicative of the motion data estimate.

11. The apparatus of claim 10, wherein the information indicative of the first basis function comprises a coded atom.

12. The apparatus of claim 11, wherein the bitstream also includes additional information associated with the coded atom, the additional information indicative of whether the motion data estimate associated with the coded atom comprises one of a motion vector or a correction to the motion vector.

13. The apparatus of claim 10, wherein the encoder is further adapted to intersperse the information indicative of the motion data estimate with information indicative of basis functions from the dictionary of basis functions in the bitstream.

14. An apparatus, comprising:
a decoder comprising a processor and a memory, the decoder adapted to:
receive a bitstream, the bitstream representing a first image frame and a second image frame in a sequence of image frames, the bitstream including motion data estimate associated with a first basis function;
extract the first basis function from the bitstream, the first basis function representing a first portion of the first image frame;
extract the motion data estimate from the bitstream, wherein the motion data estimate indicates a displacement between the first portion of the first image frame and a second portion of the second image frame, wherein the first basis function represents the second portion of the second image frame; and
generate the first image frame and the second image frame based on the first basis function and the displacement,
wherein the first basis function represents two or more pixels of the first image frame, and wherein the first basis function is included in a dictionary of basis functions.

15. The apparatus of claim 14, wherein the motion data estimate includes a correction to a motion vector, and wherein the decoder is further adapted to use the correction to modify the motion vector.

16. The apparatus of claim 15, wherein the motion vector comprises a predicted motion vector.

17. The apparatus of claim 14, wherein:
the bitstream includes additional information indicating whether at least one basis function included in the dictionary of basis functions is associated with the motion data estimate; and
the decoder is further adapted to predict a motion vector when the additional information indicates that one basis function included in the dictionary of basis functions is not associated with the motion data estimate.

18. The apparatus of claim 17, wherein when the additional information indicates that the at least one the basis functions including in the dicationary of basis functions is associated with the motion data estimate, the additional information further indicates whether the motion data estimate for one of the motion vector or a correction to the motion vector, and wherein the decoder is further adapted to modify the motion vector when the additional information indicates that the motion data estimate is for the correction to the motion vector.

* * * * *